(12) United States Patent
Nataraj et al.

(10) Patent No.: US 12,045,047 B2
(45) Date of Patent: Jul. 23, 2024

(54) FAULT DIAGNOSTICS SYSTEMS AND METHODS

(71) Applicant: Villanova University, Villanova, PA (US)

(72) Inventors: Chandrasekhar Nataraj, Chadds Ford, PA (US); Turki Haj Mohamad, Philadelphia, PA (US)

(73) Assignee: VILLANOVA UNIVERSITY, Villanova, PA (US)

( * ) Notice: Subject to any disclaimer, the term of this patent is extended or adjusted under 35 U.S.C. 154(b) by 155 days.

(21) Appl. No.: 17/352,027

(22) Filed: Jun. 18, 2021

(65) Prior Publication Data

US 2021/0397177 A1    Dec. 23, 2021

Related U.S. Application Data

(60) Provisional application No. 63/040,638, filed on Jun. 18, 2020.

(51) Int. Cl.
| | | |
|---|---|---|
| *G05B 23/02* | (2006.01) | |
| *G06F 18/2113* | (2023.01) | |
| *G06F 18/213* | (2023.01) | |
| *G06N 3/08* | (2023.01) | |

(52) U.S. Cl.
CPC ....... *G05B 23/024* (2013.01); *G05B 23/0208* (2013.01); *G05B 23/0256* (2013.01); *G06F 18/2113* (2023.01); *G06F 18/213* (2023.01); *G06N 3/08* (2013.01)

(58) Field of Classification Search
CPC .............. G05B 23/024; G05B 23/0208; G05B 23/0256; G06F 18/2113; G06F 18/213; G06N 3/08
See application file for complete search history.

(56) References Cited

U.S. PATENT DOCUMENTS

2020/0380062 A1* 12/2020 Li .................... G01N 29/2431
2021/0132150 A1*  5/2021 Chen .................. G01R 31/343

OTHER PUBLICATIONS

Aydin et al., "An approach for automated fault diagnosis based on a fuzzy decision Tree and boundary analysis of a reconstructed phase space" ISA Transactions 53 (2014) 220-229 (Year: 2014).*

(Continued)

*Primary Examiner* — John C Kuan
(74) *Attorney, Agent, or Firm* — Duane Morris LLP

(57) ABSTRACT

A computer-implemented method is provided that includes acquiring signals characterizing an operation condition of a first component of a first dynamic system, determining a phase space of the dynamic system by correlating the acquired signals and determining at least one of a time lag and mutual information of the correlated signals, determining features of the phase space of the acquired signals based on performing one of a density based process, an embedded dimension process, or a digital signal phase space topology process, training a fault detection model based on the determined features, and performing, based on the trained fault detection model, diagnostic testing on a second component of a second dynamic system to detect an operation condition fault of the second component.

20 Claims, 11 Drawing Sheets

(56) References Cited

OTHER PUBLICATIONS

Wang et al., "Fault classification of rolling bearing based on reconstructed phase space and Gaussian mixture model" Journal of Sound and Vibration 323 (2009) 1077-1089 (Year: 2009).*

T. Haj Mohamad et al., Gear Fault Diagnostics Using Extended Phase Space Topology, Annual Conference of the Prognostics and Health Management Society 2017, pp. 1-9.

T. Haj Mohamad et al., Rolling Element Bearing Diagnostics Using Extended Phase Space Topology, Journal of Vibration and Acoustics, Dec. 2018, vol. 140, pp. 061009-1-061009-9.

T. Haj Mohamad et al., Model-based Fault Diagnostics of Servo Valves, Annual Conference of the Prognostics and Health Management Society 2018, pp. 1-10.

Benoit et al., Feature selection for nonlinear models with extreme learning machines, Neurocomputing 102 (2013) 111-124, www.elsevier.com/locate/neucom.

Harsha et al., The Effect of Ball Waviness on Nonlinear Vibration Associated with Rolling Element Bearings, International Journal of Acoustics and Vibration, vol. 11, No. 2, 2006, pp. 56-66.

Kappaganthu et al., Optimal Feature Set for Detection of Inner Race Defect in Rolling Element Bearings, Annual Conference of the Prognostics and Health Management Society, 2009, pp. 1-8.

Kwuimy et al., Bifurcation analysis of a nonlinear pendulum using recurrence and statistical methods: applications to fault diagnostics, Feb. 4, 2014, Nonlinear Dyn (2014) 76: 1963-1975 DOI 10.1007/s11071-014-1261-0.

Mohamad et al, Detection of Cracks in a Rotating Shaft Using Density Characterization of Orbit Plots, Springer Nature Switzerland AG 2019, K. L. Cavalca and H. I. Weber (Eds.): TFToMM 2018, MMS 61, pp. 90-104, 2019. https://doi.org/10.1007/978-3-319-99268-6_7.

Mohamad et al., Fault identification and severity analysis of rolling element bearings using phase space topology, Journal of Vibration and Control 2021, vol. 27(3-4) 295-310.

Mohamad et al., A Review of Phase Space Topology Methods for Vibration-Based Fault Diagnostics in Nonlinear Systems, Journal of Vibration Engineering & Technologies, Jun. 19, 2019, https://doi.org/10.1007/s42417-019-00157-6.

Mohamad et al., An overview of PST for vibration based fault diagnostics in rotating machinery, MATEC Web of Conferences 211, 01004 (2018), https://doi.org/10.1051/matecconf/201821101004.

Mohamad et al., Multi-speed Multi-load Bearing Diagnostics Using Extended Phase Space Topology, MATEC Web of Conferences 241, 01011 (2018) CSNDD 2018, https://doi.org/10.1051/matecconf/201824101011.

Mohamad et al., Using the Gottwald and Melbourne's 0-1 test and the Hugichi fractal dimension to detect chaos in defective and healthy ball bearings, MATEC Web of Conferences 241, 01017 (2018) CSNDD 2018, https://doi.org/10.1051/matecconf/201824101017.

Mohamad et al., Gear Fault Detection Using Recurrence Quantification Analysis and Support Vector Machine, Journal of Software Engineering and Applications, 11, 181-203. https://doi.org/10.4236/jsea.2018.115012.

Nie et al., Using vibration phase space topology changes for structural damage detection, Structural Health Monitoring, 11 (5) 538-557 © The Author(s) 2012, Reprints and permissions: sagepub.co.uk/journalsPermissions.nav DOI: 10.1177/14759217 12447590 shm.sagepub.com.

Samadani et al., Characterization of Phase Space Topology Using Density: Application to Fault Diagnostics, Annual Conference of the Prognostics and Health Management Society, 2015, pp. 1-8.

Samadani et al., Diagnostics of a Nonlinear Pendulum Using Computational Intelligence, Proceedings of the ASME 2013 Dynamic Systems and Control Conference, DSCC2013, Oct. 21-23, 2013, Palo Alto, California, USA, DSCC2013-4054, pp. 1-9.

Todd et al., Vibration-based damage assessment utilizing state space geometry changes: local attractor variance ratio, Smart Materials and Structures, Institute of Physics Publishing, Smart Mater. Struct. 10 (2001) 1000-1008.

Verikas et al., Feature selection with neural networks, Pattern Recognition Letters 23 (2002) 1323-1335, 2002 Elsevier Science B.V., PII: S0 167-8655(02)00081-8.

* cited by examiner

| | Test Confusion Matrix | | | | Sensitivity | Precision |
|---|---|---|---|---|---|---|
| H | 44 / 23.2% | 0 / 0.0% | 0 / 0.0% | 0 / 0.0% | 100.0% | 100.0% |
| IR | 0 / 0.0% | 51 / 26.8% | 0 / 0.0% | 0 / 0.0% | 100.0% | 100.0% |
| OR | 0 / 0.0% | 0 / 0.0% | 48 / 25.3% | 0 / 0.0% | 100.0% | 100.0% |
| B | 0 / 0.0% | 0 / 0.0% | 0 / 0.0% | 47 / 24.7% | 100.0% | 100.0% |
| | H | IR | OR | B | Overall Accuracy 100.0% | |

FIG. 4A

| | Test Confusion Matrix | | | | Sensitivity | Precision |
|---|---|---|---|---|---|---|
| H | 150 / 25.0% | 0 / 0.0% | 0 / 0.0% | 0 / 0.0% | 100.0% | 100.0% |
| IR | 0 / 0.0% | 142 / 23.7% | 0 / 0.0% | 0 / 0.0% | 94.7% | 100.0% |
| OR | 0 / 0.0% | 0 / 0.0% | 139 / 23.2% | 1 / 0.2% | 92.7% | 99.3% |
| B | 0 / 0.0% | 8 / 1.3% | 11 / 1.8% | 149 / 24.8% | 99.3% | 88.7% |
| | H | IR | OR | B | Overall Accuracy 96.7% | |

FIG. 4B

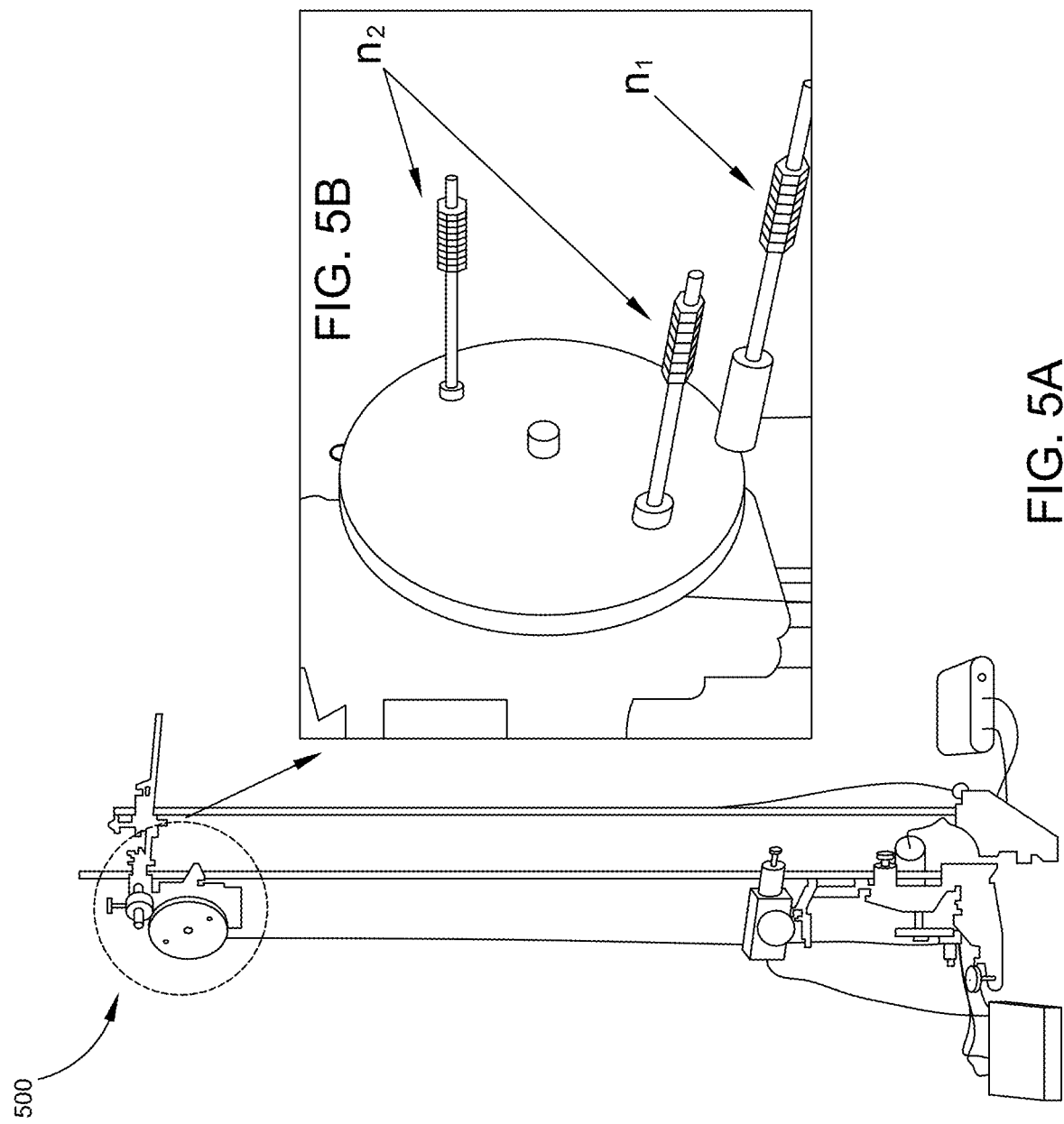

FAULT DIAGNOSTICS SYSTEMS AND METHODS

CROSS REFERENCE TO RELATED APPLICATIONS

This application claims benefit of U.S. Provisional Patent Application No. 63/040,638 filed Jun. 18, 2020, the entirety of which is incorporated by reference herein.

STATEMENT REGARDING GOVERNMENT SUPPORT

Some of the information disclosed herein may be determined to relate to inventions made with government support under grant ONR N0014-15-1-2311, awarded by the Office of Naval Research. To the extent any such information ultimately becomes the subject of allowed claims, the government may have certain rights in those claimed inventions.

TECHNICAL FIELD

The disclosure relates generally to fault diagnostics, and more particularly, to diagnosing the nature and magnitude of faults within dynamic systems.

BACKGROUND

Various dynamic systems, such as electrical and mechanical systems, utilize many components in order to operate. However, faults in these components may render the dynamic system inoperable or cause the system to malfunction. For example, ball bearings of certain systems may include faults of varying severity on the inner race, outer race, or the roller. In another example, gears of certain systems may include a root crack on one tooth, a missing tooth, or cracks on several teeth, or one or more cracks in the gear itself. In other examples, shafts may include cracks, and electrohydraulic servo actuators may be worn or contaminated, causing increased friction.

Dynamic systems are non-linear, i.e., the change in output of the dynamic system is not proportional to the change in input to the dynamic system. To diagnose a fault, conventional fault diagnostic techniques map information obtained in the measurement space to the presence and magnitude of faults in the fault space. However, the non-linearity of the dynamic systems makes diagnosing faults generally difficult. As faults are introduced to components of the dynamic system or increase in severity, the faults vary the operating conditions of the components and further increase the non-linearity of the dynamic system, thereby increasing the difficulty in detecting a fault or a severity of a fault. Moreover, to inspect the dynamic system, a user may have to take the dynamic system offline and disassemble the system to perform the inspection.

To compensate for the difficulty in determining faults within a dynamic system, a conventional machine learning model may use many features to detect a fault. However, these features may not adequately characterize the fault. As such, the complexity of the machine learning model, and in turn the processing power, increases to compensate for the characterization deficiencies in these features. Further, conventional techniques for detecting faults, e.g., bearing faults, involve pattern recognition. However, these techniques may only be effective for an a priori defined operating condition set, such as shaft rotational speed, and are not applicable to detect faults in other dynamic systems. Thus, because the conventional models are dependent on the dynamic response, the conventional classification model is retrained each time the operating condition (e.g., rotational shaft speed) changes, i.e., the variable change.

SUMMARY

The summary of the disclosure is given to aid understanding of fault diagnostics, and more particularly, to diagnosing the nature and magnitude of faults within dynamic systems, and not with an intent to limit the disclosure. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the systems, devices, and their methods of operation to achieve different effects. Certain aspects of the present disclosure provide a system, method, and non-transitory computer readable medium for fault diagnostics.

In one or more embodiments, a data processing apparatus includes a communications interface; a memory storing instructions; and at least one processor coupled to the communications interface and to the memory. In one or more cases, the least one processor is configured to execute the instructions to perform operations including acquiring signals characterizing an operation condition of a first component of a first dynamic system. In one or more cases, the least one processor is configured to execute the instructions to perform operations including determining a phase space of the dynamic system by correlating the acquired signals and determining at least one of a time lag and mutual information of the correlated signals. In one or more cases, the least one processor is configured to execute the instructions to perform operations including determining features of the phase space of the acquired signals based on performing one of a density based process, an embedded dimension process, or a digital signal phase space topology process. In one or more cases, the least one processor is configured to execute the instructions to perform operations including training a fault detection model based on the determined features. In one or more cases, the least one processor is configured to execute the instructions to perform operations including performing, based on the trained fault detection model, diagnostic testing on a second component of a second dynamic system to detect an operation condition fault of the second component.

In one or more embodiments, a computer-implemented method includes acquiring signals characterizing an operation condition of a first component of a first dynamic system. In one or more cases, the computer-implemented method includes determining a phase space of the dynamic system by correlating the acquired signals and determining at least one of a time lag and mutual information of the correlated signals. In one or more cases, the computer-implemented method includes determining features of the phase space of the acquired signals based on performing one of a density based process, an embedded dimension process, or a digital signal phase space topology process. In one or more cases, the computer-implemented method includes training a fault detection model based on the determined features. In one or more cases, the computer-implemented method includes performing, based on the trained fault detection model, diagnostic testing on a second component of a second dynamic system to detect an operation condition fault of the second component.

In one or more embodiments, a tangible, non-transitory computer-readable medium storing instructions that, when executed by at least one processor, cause the at least one processor to perform a method. In one or more cases, the method includes acquiring signals characterizing an operation condition of a first component of a first dynamic system. In one or more cases, the method includes determining a phase space of the dynamic system by correlating the acquired signals and determining at least one of a time lag and mutual information of the correlated signals. In one or more cases, the method includes determining features of the phase space of the acquired signals based on performing one of a density based process, an embedded dimension process, or a digital signal phase space topology process. In one or more cases, the method includes training a fault detection model based on the determined features. In one or more cases, the method includes performing, based on the trained fault detection model, diagnostic testing on a second component of a second dynamic system to detect an operation condition fault of the second component.

BRIEF DESCRIPTION OF THE DRAWINGS

The features and advantages of the present disclosure will be better understood when read in conjunction with the figures provided. Embodiments are provided in the figures for the purpose of illustrating aspects, and/or features, of the various embodiments, but the claims should not be limited to the precise arrangements, structures, features, aspects, methods, processes, assemblies, systems, or devices shown, and the arrangements, structures, features, aspects, methods, processes, assemblies, systems, and devices shown may be used singularly or in combination with other arrangements, structures, features, aspects, methods, processes, assemblies, systems, and devices.

FIGS. 4A and 4B illustrate example predictions of defects for example bearings.

FIG. 5A illustrates a nonlinear pendulum, and FIG. 5b illustrates an enlarged view of the nonlinear pendulum and example rotary motion sensors.

DETAILED DESCRIPTION

Figure 1:
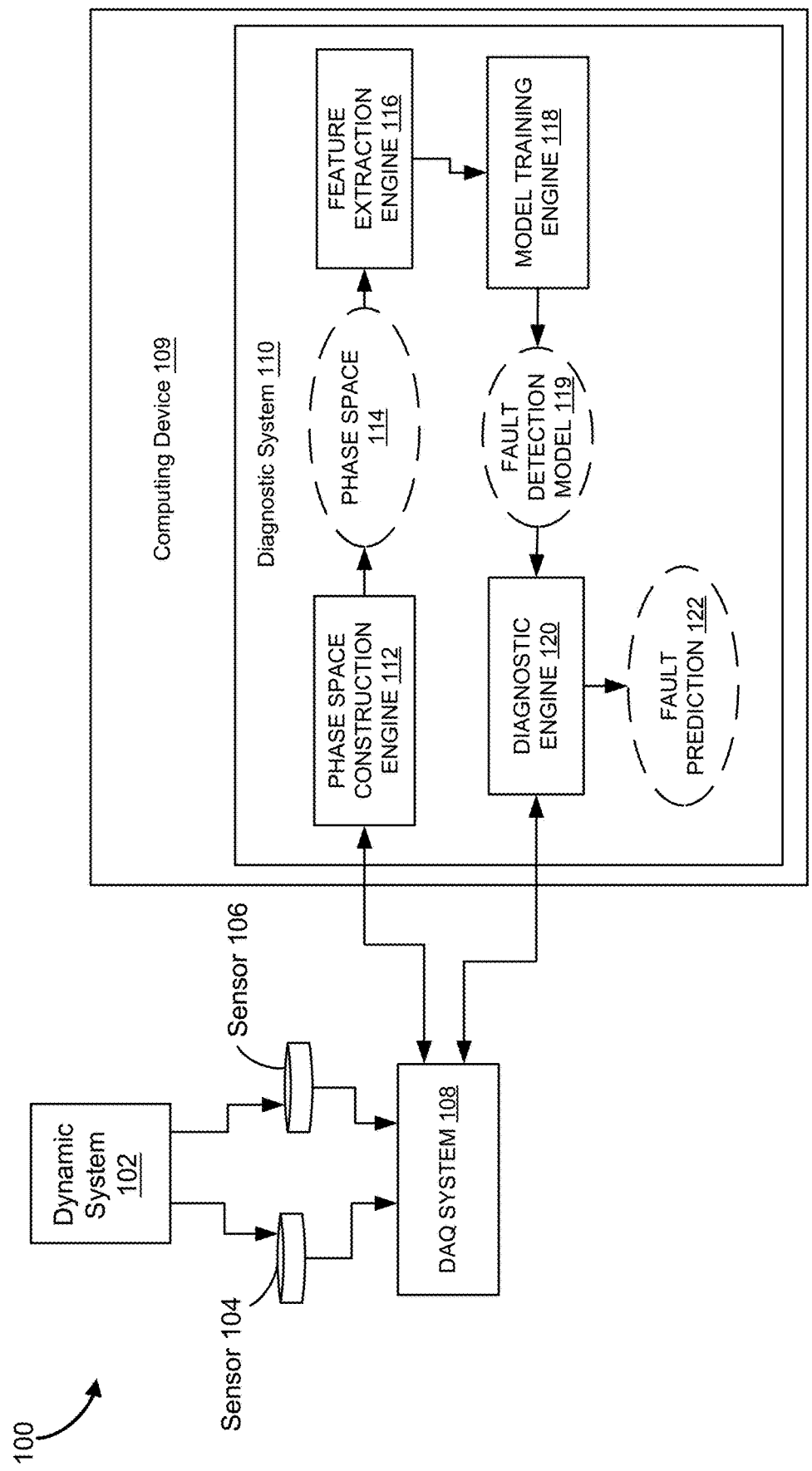
FIG. 1 is a functional block diagram of a fault diagnostic data processing environment, in accordance with one or more embodiments.

The following discussion omits or only briefly describes conventional features of the fault diagnostic data processing environment, which are apparent to those skilled in the art. It is noted that various embodiments are described in detail with reference to the drawings, in which like reference numerals represent like drawing elements throughout the figures. Reference to various embodiments does not limit the scope of the claims attached hereto. Additionally, any examples set forth in this specification are intended to be non-limiting and merely set forth some of the many possible embodiments for the appended claims. Further, particular features described herein can be used in combination with other described features in each of the various possible combinations and permutations. The objectives and advantages of the claimed subject matter will become more apparent from the following detailed description of these embodiments in connection with the accompanying drawings.

Unless otherwise specifically defined herein, all terms are to be given their broadest possible interpretation including meanings implied from the specification as well as meanings understood by those skilled in the art and/or as defined in dictionaries, treatises, etc. It is also noted that, as used in the specification and the appended claims, the singular forms "a," "an," and "the" include plural referents unless otherwise specified, and that the terms "comprises" and/or "comprising," when used in this specification, specify the presence or addition of one or more other features, aspects, steps, operations, elements, components, and/or groups thereof. Moreover, the terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Embodiments of the disclosure relate generally to fault diagnostics, and more particularly diagnosing the nature and magnitude of faults within dynamic systems. Embodiments that diagnose faults within a dynamic system are described below with reference to the figures.

FIG. 1 is a functional block diagram of a data processing environment 100. FIG. 1 provides only an illustration of one implementation and does not imply any limitations with regard to the environments in which different embodiments may be implemented. Many modifications of the depicted environment may be made by those skilled in the art without departing from the scope of the claims.

In one or more cases, the data processing environment 100 includes a computing device 109, which operates a fault diagnostic system 110 (hereinafter "diagnostic system 110"), a data acquisition ("DAQ") system 108, one or more sensors, such as sensors 104 and 106, and a dynamic system 102, operably coupled to one another. For example, the dynamic system 102, DAQ system 108, sensors 104 and 106, and diagnostic system 110 may be operably coupled to one another via any combination of connections and protocols capable of supporting communication among these devices. The computing device 109 and DAQ system 108 can each be any suitable computing device that includes any hardware or hardware and software combination for processing and handling information, and transmitting and receiving data among the dynamic system 102, sensors 104 and 106, and the diagnostic system 110. The dynamic system 102, computing device 109, diagnostic system 110, DAQ system 108, and sensors 104 and 106 can each include one or more processors, one or more field-programmable gate arrays (FPGAs), one or more application-specific integrated circuits (ASICs), one or more state machines, digital circuitry, and any other suitable circuitry capable of implementing one or more processes of fault diagnostic process 200, as described herein.

In one or more cases, the dynamic system 102 may be any type of electrical and/or mechanical system that includes one or more components, for example, but not limited to, nonlinear pendulums, bearings, gears, shafts, servo actuators (e.g., electrohydraulic servo actuators), electric motors, and the like. In one or more cases, a sensor, such as sensor 104 or 106 may be operably coupled to a component of the dynamic system 102 to provide sensor data to the diagnostic system 110, via the DAQ system 108, to detect a fault. For example, as illustrated in FIGS. 5A and 5B, for the cases in which sensors, e.g., sensors 104, 106, and a nonlinear pendulum 500 are operably coupled to one another, the sensors 104, 106 (illustrated as $n_1$ and $n_2$ in FIG. 5B) may be rotary motion sensors used to detect a fault in parameter estimations. In an example, the example rotary motion sensor may be used to estimate a fault parameter such as a lumped mass of the nonlinear pendulum 500.

In another example, for the cases in which sensors, e.g., sensor 104 and 106, and a bearing are operably coupled to one another, the sensors 104, 106 may include proximity probes and accelerometers used to detect a fault in the outer race, inner race, and/or roller of the bearing. A proximity probe may be, for example, but not limited to, a non-contact displacement transducer that is accurate to $\frac{1}{10,000}$ of an inch. In another example, for the cases in which sensors, e.g., sensor 104 and 106, and a gear are operably coupled together, the sensors 104, 106 may include one or more accelerometers and a tachometer used to detect a fault in the gear, such as a single crack, multiple cracks, and/or a missing tooth or teeth of the gear. In another example, for the cases in which sensors, e.g., sensor 104 and 106, and a shaft are operably coupled together, sensors 104, 106 may include proximity probes used to detect propagated cracks in the shaft. In yet another example, for the cases in which sensors, e.g., sensor 104 and 106, and a servo actuator are operatively coupled to one another, the sensors 104, 106 may include position sensors, velocity sensors, pressure sensors, and the like to detect spool friction or a position of a permanent magnet. In one or more cases, the sensors 104 and 106 may be sensors with a resolution sufficient to capture the dynamics, e.g., acceleration, displacement, velocity, electric current, temperature, of the coupled component.

It should be noted that a dynamic system 102 may include, but is also not limited to, medical implant devices, such as, but not limited to, pacemakers; medical devices, such as, but not limited to, ventilators; and medical and healthcare facility systems, such as, but not limited to, medical gas systems, such as those that supply oxygen, anesthetic gases, and the like. In an example, sensors 104 and 106 may be current sensors operably coupled to the leads of a pacemaker, and used to detect a fault in the pacemaker, such as faulty leads or a dead battery. In another example, sensors 104 and 106 may be temperature sensors operably coupled to a medical implant, and be used to detect a fault in the implant based on elevated temperatures of a patient's body at and around the medical implant site, in which the elevate temperature indicates an infection. It is noted that the sensors 104 and 106 may include or be operably coupled to an electronic device configured to wirelessly transmit data of the respective sensors 104 and 106 outside the patient's body in a noninvasive manner to another electronic device, such as DAQ system 108.

In one or more cases, the DAQ system 108 may be operably coupled to the sensors 104 and 106, such that the DAQ system 108 may be configured to receive the signals provided by the sensors 104 and 106 and provide these signals to the diagnostic system 110. For example, the DAQ system 108 may include a data processor configured to receive raw signals from the sensors 104 and 106 and to process the raw signals to remove invalid data, anomalies, and the like. In another example, the DAQ system 102 includes a signal processor that is configured to receive the processed signals from the data processor and further process the received processed signals using a variety of methods, such as, but not limited to, Fourier Transform methods, Wavelet Transform methods, Spectral methods, and the like. Moreover, the signal processor may employ noise removal algorithms to the signals and further clean the signals for generating features and/or building models.

In one or more cases, the computing device 109 hosts the diagnostic system 110. In some cases, the computing device 109 may be a web server, a blade server, a mobile computing device, a laptop computer, a tablet computer, a netbook computer, a personal computer (PC), a desktop computer, or any programmable electronic device or computing system capable of receiving and sending data, via the network, and performing computer-readable program instructions. In other cases, the computing device 109 can be a data center, which includes a collection of networks and servers, such as virtual servers and applications deployed on virtual servers, providing an external party access to the diagnostic system 110. In some other cases, the computing device 109 represents a computing system utilizing a distributed computing system of clustered computers and components (e.g., database server computer, application server computers, etc.) that act as a single pool of seamless resources, such as in a cloud computing environment, when accessed within data processing environment 100. In one or more cases, the computing device includes a data storage repository configured to store data including, but not limited to a phase space 114, features, fault detection model 119, and other like data that is used to perform diagnostics on the dynamic system 102.

In one or more cases, computing device 109 includes a user interface for providing an end user with the capability to interact with the diagnostic system 110. For example, an end user of the computing device 109 may access the diagnostic system 110 through the user interface to access one or more components of the diagnostic system 110, for example, to view detected faults within the dynamic system 102, and to train or update one or more models, such as the fault diagnostic model 119 described herein. A user interface refers to the information (such as graphic, text, and sound) a program presents to a user and the control sequences the user employs to control the program. It is noted that the DAQ system 108 and computing device 109 are illustrated as two separate items; however, it should be understood that the DAQ system 108 and the computing device 109 may be one item, i.e., the DAQ system 108 is integrated with the computing device 109.

In one or more cases, the diagnostic system 110 includes a phase space construction engine 112, a feature extraction engine 116, a model training engine 118, and a diagnostic engine 120. In one or more examples, the phase space construction engine 112, the feature extraction engine 116, the model training engine 118, and the diagnostic engine 120 may be implemented in hardware. In one or more examples, the phase space construction engine 112, the feature extraction engine 116, the model training engine 118, and the diagnostic engine 120 may be implemented as an executable program maintained in a tangible, non-transitory memory, such as instruction memory 307 of FIG. 3, which may be executed by one or more processors, such as processor 301 of FIG. 3.

Figure 2A:
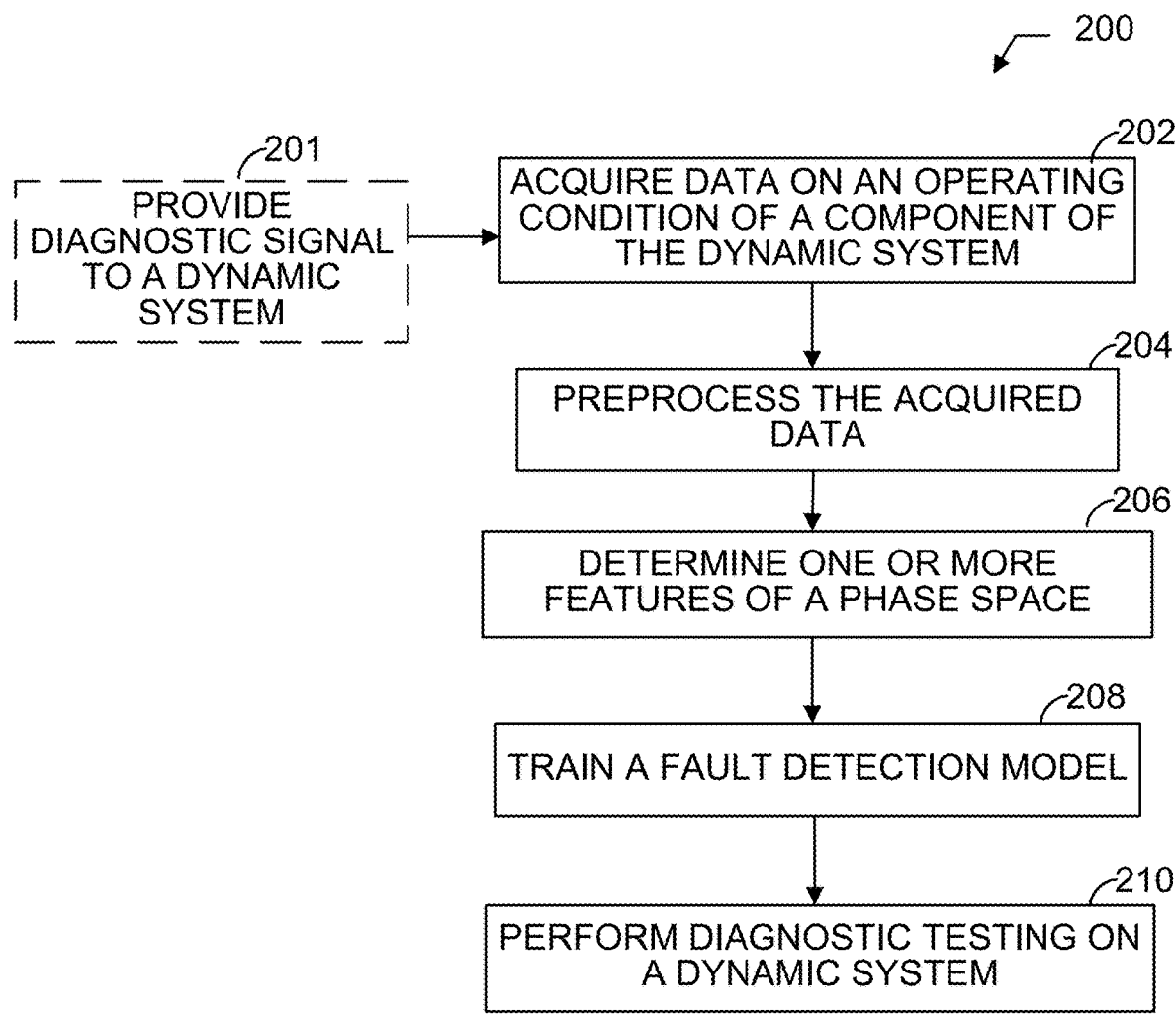
FIG. 2A is a flowchart illustrating an example fault diagnostic process, in accordance with one or more embodiments.

FIG. 2A is a flowchart illustrating an example fault diagnostic process 200.

It is noted that, while the examples discussed herein are directed to detecting faults in, for example bearings, the embodiments discussed herein may be used to detect faults in components (e.g., but not limited to, nonlinear pendulums, gears, shafts, servo actuators, electric motors, and other like components) of other dynamic systems, and are not limited to detecting faults in only bearings.

Figure 6:
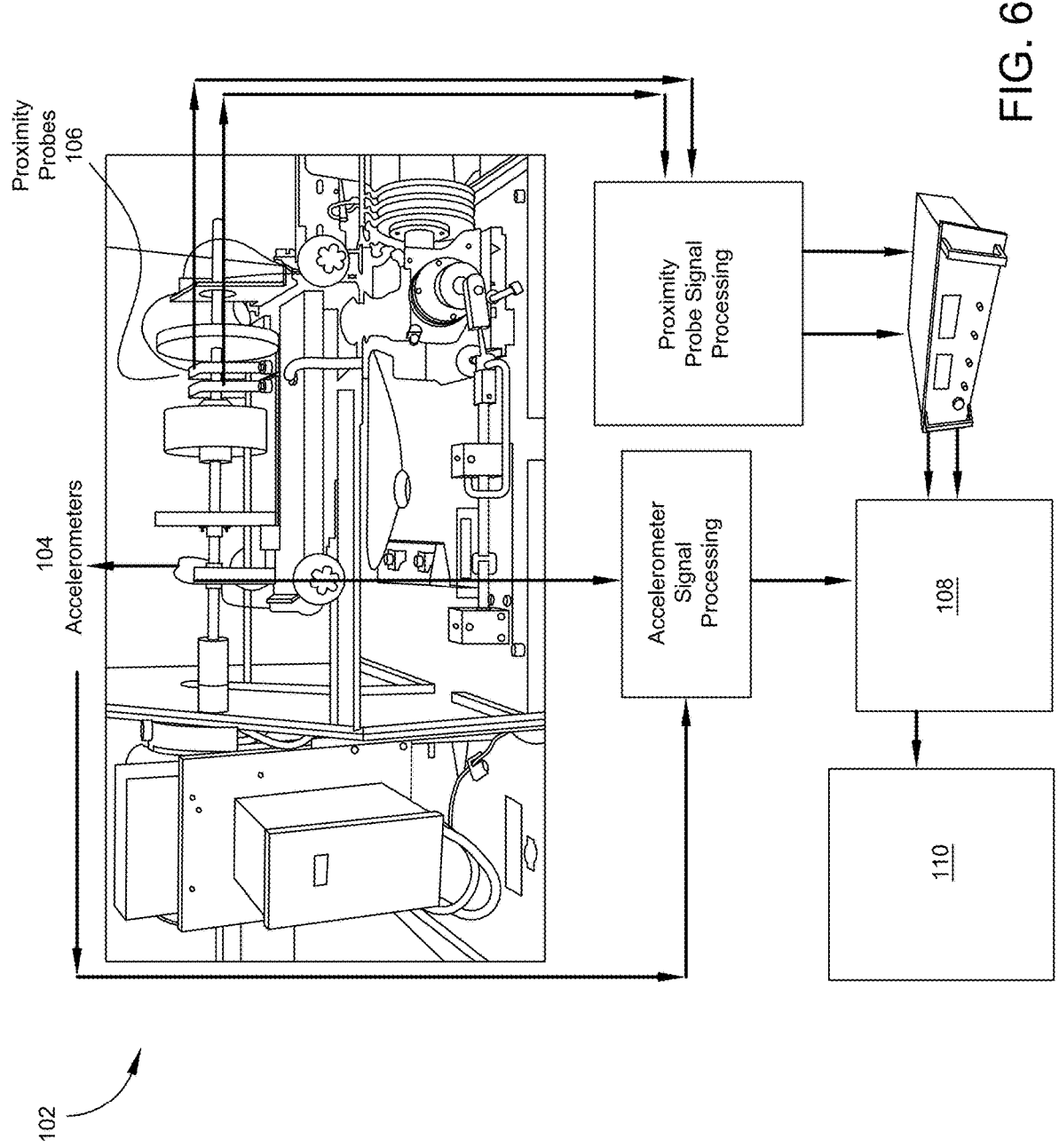
FIG. 6 illustrates an example rotating fault simulator machine.

Data on an operation condition of a component of the dynamic system 102 is acquired (202), preferably by the DAQ system 108. In one or more cases, the DAQ system 108 may acquire one or more signals, via sensors 104 and/or 106, characterizing the operation condition of the component of the dynamic system 102. For example, for the cases in which the dynamic system 102 includes a component, such as a bearing, an operation condition of the bearing may include, for example, but not limited to, rotational speed, load, and unbalance. Sensors 104, and 106 may be, for example, one or more proximity probes and accelerometers operably coupled to the bearing to measure the displacement and acceleration of the bearing. For example, the proximity probes may be coupled to the bearing in orthogonal directions and installed near the bearing housing, as illustrated in FIG. 6. In another example, the sensors 104 and 106 may be operably coupled to certain aspects (e.g., an outer race, inner race, and/or a roller) of the bearing to measure the displacement and acceleration of the aspect to which the sensors are coupled. The sensors 104 and 105 may provide these signals as data to the DAQ system 108.

Figure 7A:
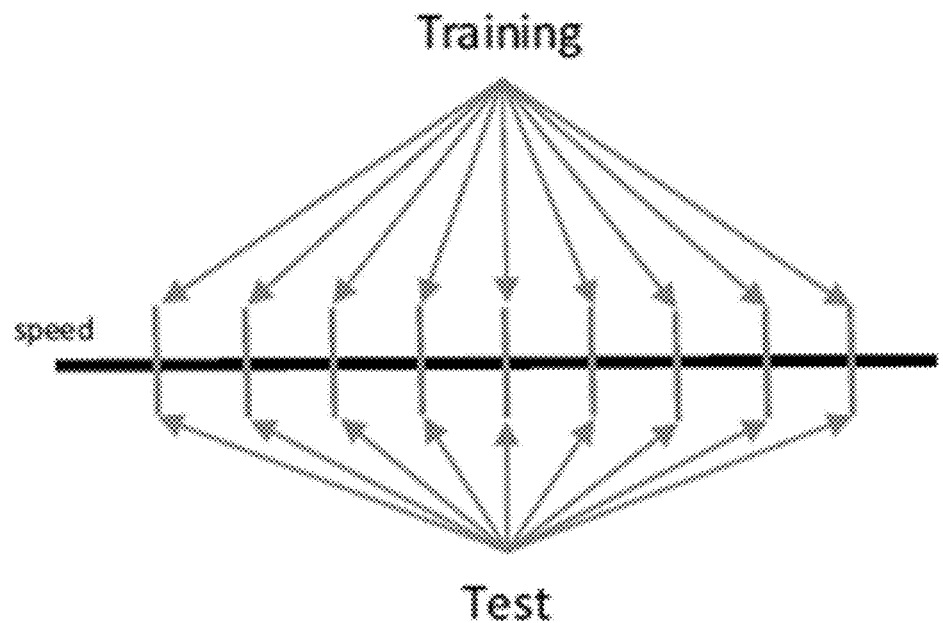
FIG. 7A illustrates an example speed configuration for training and testing known speed domains.
Figure 7B:
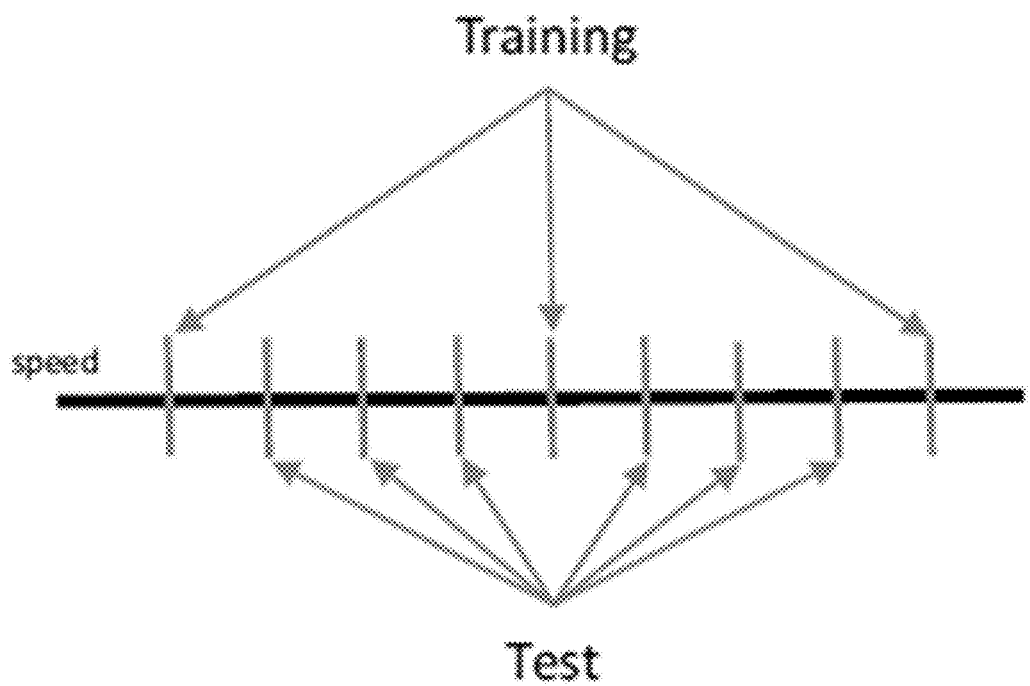
FIG. 7B illustrates an example speed configuration for training and testing bounded speed domains.

In the first and second examples provided herein, different rotational speed configurations between the training and testing sets of the classification model are analyzed using known speed domains, as illustrated in FIG. 7A, and bounded speed domains, as illustrated in FIG. 7B. In these examples, the classification problem was initially trained on a set of speeds and then the classifier was tested on the same set of speeds. In the first example, the example classifier was trained and tested at the same 19 example rotational speeds. In the second example, the bearing fault diagnostic approach was generalized to variable operating speeds within a given range of speeds, e.g., 300 rpm to 3000 rpm. In the second example, the classifier was trained on one set of speeds and then tested on another different set of speeds, in which the speed test domains were bounded by the training sets, as illustrated in FIG. 7B. Further, in the first and second examples described below, four bearing conditions were investigated: healthy bearings (H), bearings with inner race defects (IR), bearings with outer race defects (OR), and bearings with ball defects (B). In the first example that analyzes known speed domains, the sensors 104 and 106 measure the displacement (e.g., vibration data) and acceleration (e.g. acceleration data) of the bearing in a rotational speed range of, for example, 300-3000 rpm. In the second example that analyzes bounded speed domains, the sensors 104 and 106 measure the displacement and acceleration of the bearing in several rotational speed ranges (e.g., the dynamic machine 102 operating range boundaries, such as, 300 rpm and 3000 rpm, and two other speeds 1200 rpm and 2400 rpm). For the rotational speeds in the second example, the diagnostic system 110 trained the example fault detection model 119 using the available vibration data of 160 total samples at different bearing operating conditions, and the diagnostic system 110 used another 600 samples obtained at other speeds (e.g., 420 rpm, 600 rpm, 2820 rpm, and other measured speeds) to test the fault detection model 119. The vibration data for each example was measured using two proximity probes 106 placed in orthogonal directions and installed close to the bearing housing of the rotating fault simulator, i.e., the dynamic system 102, as illustrated in FIG. 6. The proximity probes 106 may be, for example, but not limited to, GE/Bently Nevada 7200 series proximity probe sensors.

The acquired data is preprocessed (204), preferably by the DAQ system 108. In one or more cases, the DAQ system 108 preprocesses the acquired data to condition the data to remove or reduce errors in subsequent processing. In one or more cases, the DAQ system 108 preprocesses the acquired data. For example, the DAQ system 108 may receive raw signals from the sensors 104 and 106 and process the raw signals to remove invalid data, anomalies, and the like. Moreover, the DAQ system 108 may further process the signals using a variety of methods as described, such as, but not limited to, Fourier Transform methods, Wavelet Transform methods, Spectral methods, and the like. In yet another example, for bearing fault diagnostics, the DAQ system 108 processes the acquired signal using a segmentation by sampling rate to period method, and further processing the acquired signal using a denoising method. In another example, for gear diagnostics, the DAQ system 108 processes the acquired signal using the tachometer signal, in order to provide a full cycle of segmented data.

One or more features of a phase space are determined (206), preferably by the diagnostic system 110. In one or more cases, to determine one or more features of the phase space, the diagnostic system 110 may estimate time lag and/or mutual information of the processed signals. For example, the diagnostic system 110, and preferably the phase space construction engine 112, correlates the processed signals of the sensors 104 and 106 via estimating the mutual information for the processed signal of the sensor 104 and for the processed signal of the sensor 106. That is, the phase space construction engine 112 determines the mutual information for the signal provided by a sensor, e.g., the processed accelerometer signal provided by sensor 104. Further, the phase space construction engine 112 estimates the time lag for the processed signal of the sensor 104 and for the processed signal of the sensor 106. In one or more cases, the phase space construction engine 112 may estimate the time lag for each processed signal. In one or more cases, the phase space construction engine 112 may estimate the time lag for a processed signal in a time series by plotting the time series for the processed signal against another processed signal that is later in time. In one or more other cases, the phase space construction engine 112 may estimate the time lag for a processed signal in a time series by shifting the time series of the processed signal, and comparing the original time series of the processed signal to the shifted time series of the processed signal.

In one or more cases, having estimated the mutual information and the time lag of the processed signals, the phase space construction engine 112 constructs a phase space 114 of the dynamic system 102. For example, the phase space construction engine 112 applies Takens theorem, or other like methods, to construct the phase space 114 of the dynamic system 102. The phase space construction engine 112 may construct the phase space 114 of the measured components, e.g., the bearing, and/or the one or more aspects of the bearing, such as the outer race, inner race, and roller, of the dynamic system 102. The phase space 114 may be a geometric depiction of a dynamical response of the dynamic system 102. The phase space construction engine 112 may provide the constructed phase space 114 to the feature extraction engine 116.

Figure 2B:
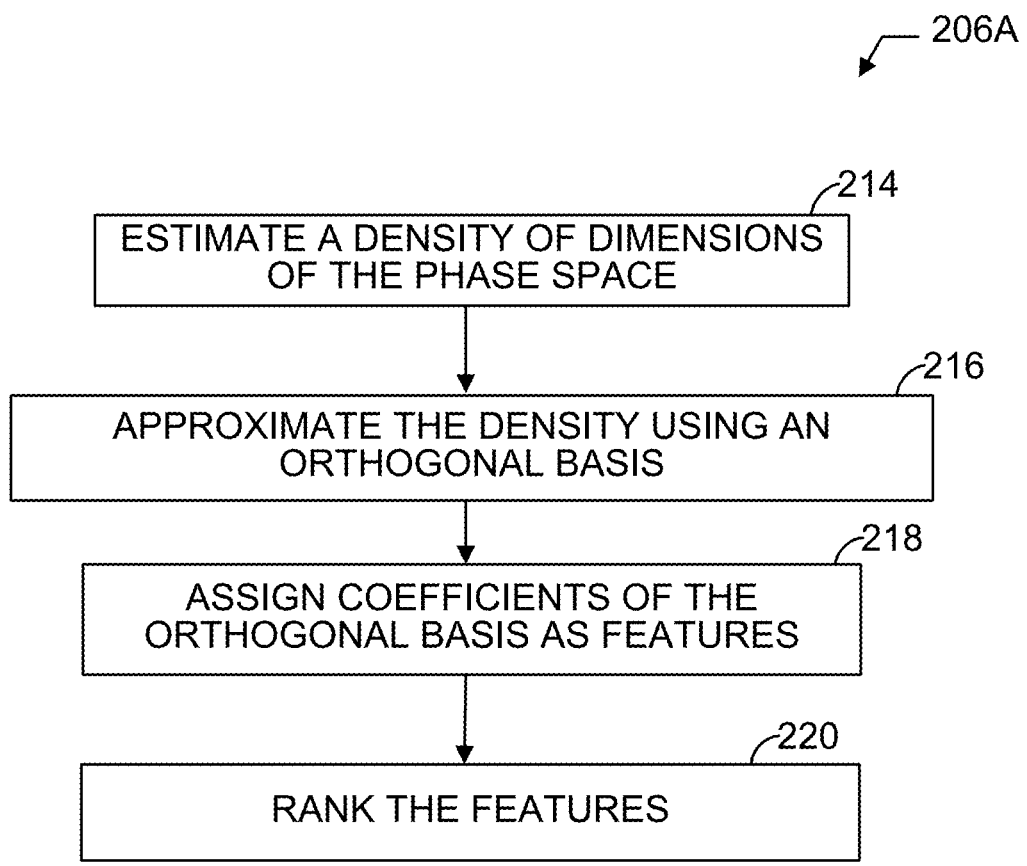
FIG. 2B is a flowchart illustrating an example phase space topology process for the example fault diagnostic process of FIG. 2A, in accordance with one or more embodiments.
Figure 2C:
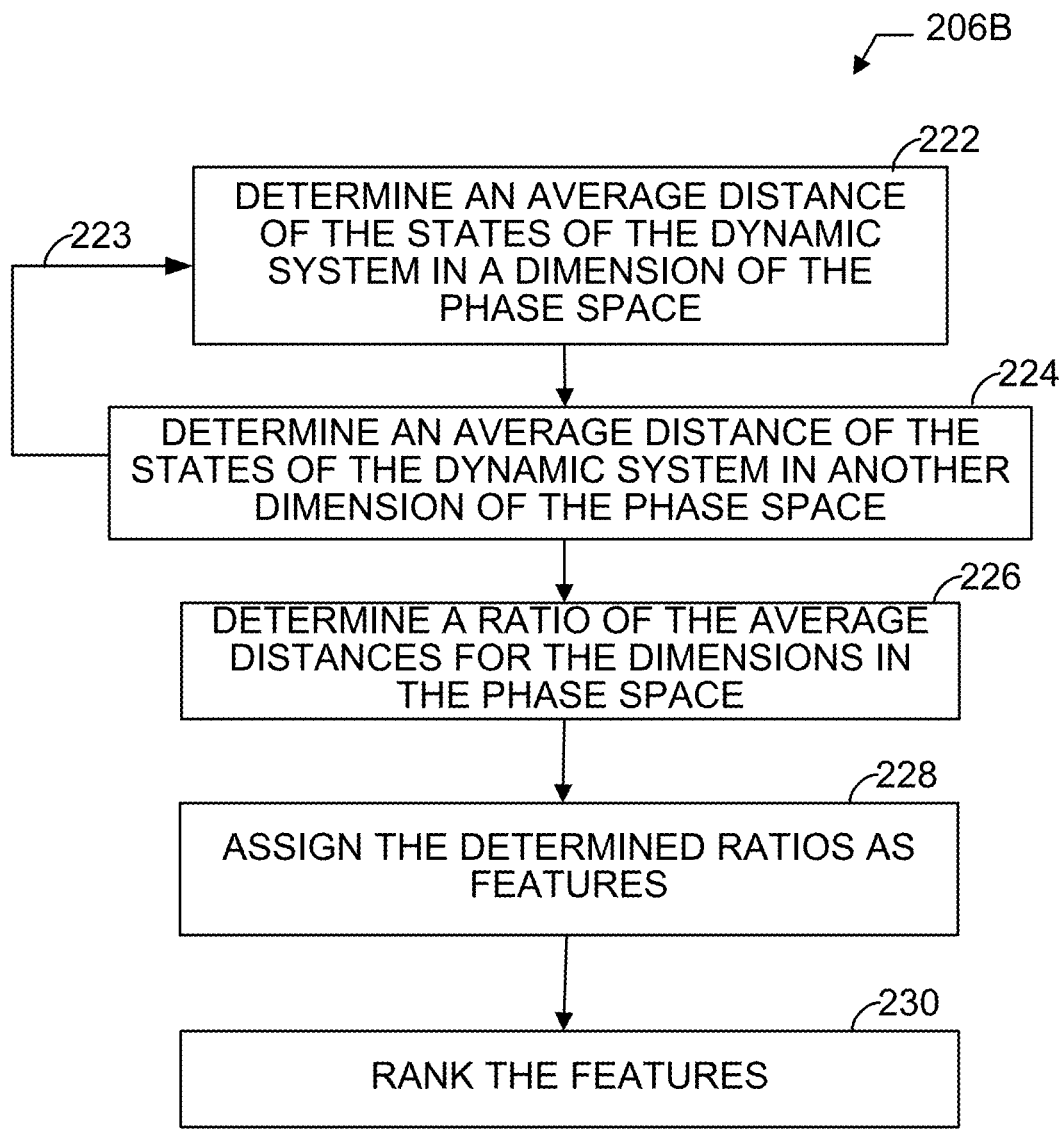
FIG. 2C is a flowchart illustrating another example phase space topology process for the example fault diagnostic process of FIG. 2A, in accordance with one or more embodiments.

In one or more cases, one or more features of the phase space 114 are determined (206), preferably by the feature extraction engine 116. The feature extraction engine 116 determines the one or more features of the phase space 114 based on a variety of fault diagnostic processes, as illustrated in FIGS. 2A, 2B, and 2C. For example, FIG. 2B illustrates a density based fault diagnostic process 206A. In another example, FIG. 2C illustrates an embedded dimension process 206B. In yet another example, the additional element 201 of providing a diagnostic signal to the dynamic system 102, as shown in FIG. 2A, illustrates a digital signal phase space topology process. In one or more cases, a feature set may be ideal when the feature set is able to reconstruct the original data.

With respect to the density based fault diagnostic process 206A as illustrated in FIG. 2B, the density of dimensions of the phase space 114 is estimated (214), preferably by the feature extraction engine 116. In one or more cases, having received the constructed phase space 114, the feature extraction engine 116 estimates the density of dimensions of the phase space 114 based on one or more parameters. For example, the feature extraction engine 116 performs a Kernel density estimation method on the dimensions of the phase space 114. To estimate the Kernel density, let $X=(x_1, x_2, \ldots, x_n)$ be an independent and identically distributed sample data drawn from a distribution with an unknown density function $f$. The shape of this function can be estimated by its kernel density estimator (the hat, ^, indicates that it is an estimate, and the subscript indicates that its value can depend on h).

$$\hat{f}_h(x) = \frac{1}{nh} \sum_{i=1}^{n} K\left(\frac{x-x_i}{h}\right), \quad (1)$$

where h>0 is a smoothing parameter called the bandwidth, and K (·) is the kernel function which satisfies the following requirements:

$$\int_{-\infty}^{\infty} K(u)du = 1, \; K(-u) = K(u) \forall\, u. \quad (2)$$

A range of kernel functions may be used, including, but not limited to, uniform, triangular, biweight, triweight, Epanechnikov, and normal density functions. The normal density function may be defined as follows:

$$K(u) = \frac{1}{\sqrt{2\pi}} e^{-\frac{1}{2}u^2}. \quad (3)$$

Figure 8A:
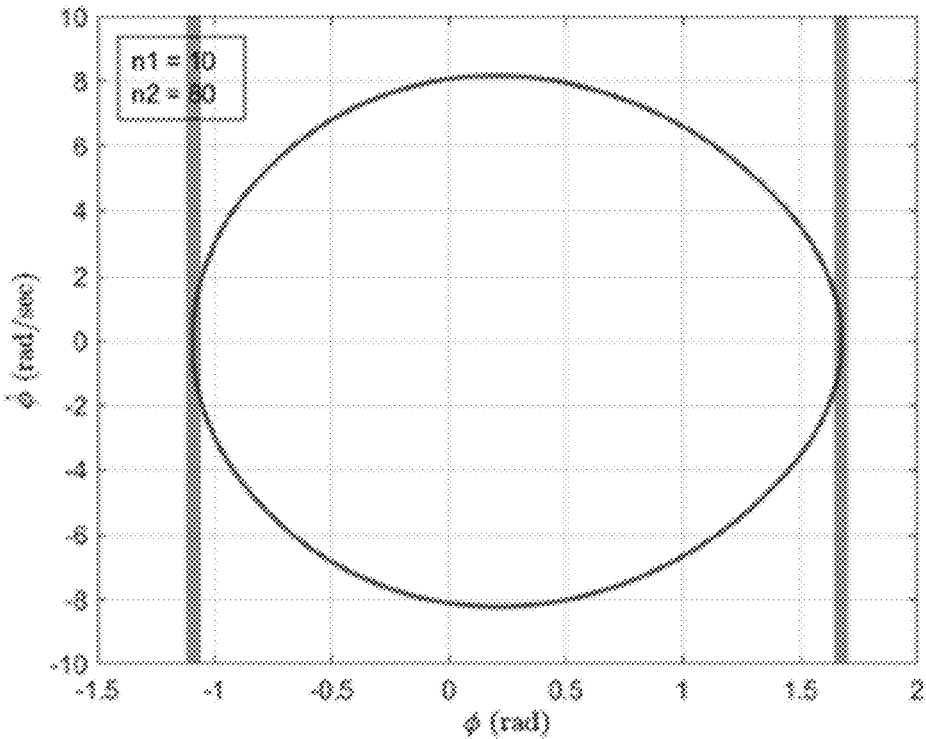
FIG. 8A illustrates the phase plane for a periodic domain response.
Figure 8B:
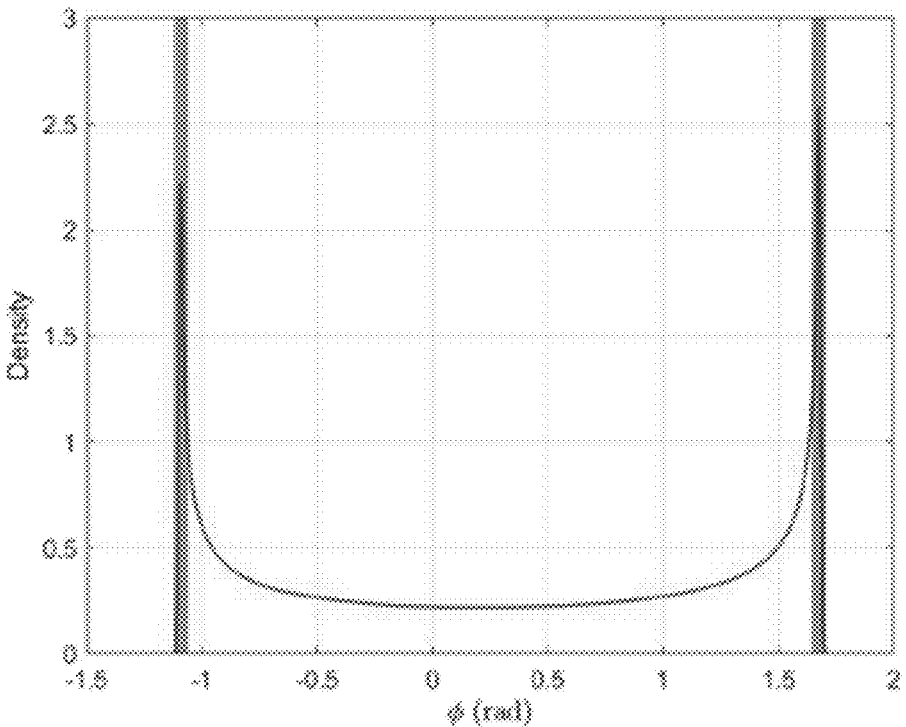
FIG. 8B illustrates a corresponding density distribution for the periodic domain response, illustrated in FIG. 8A.
Figure 8C:
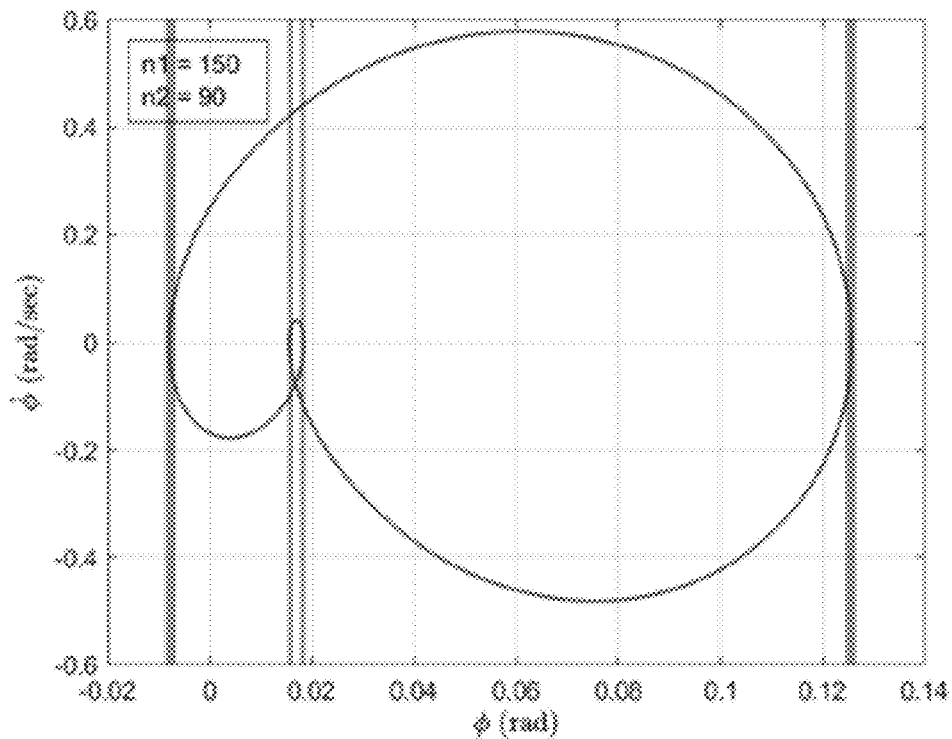
FIG. 8C illustrates the phase plane for a multi-periodic domain response.
Figure 8D:
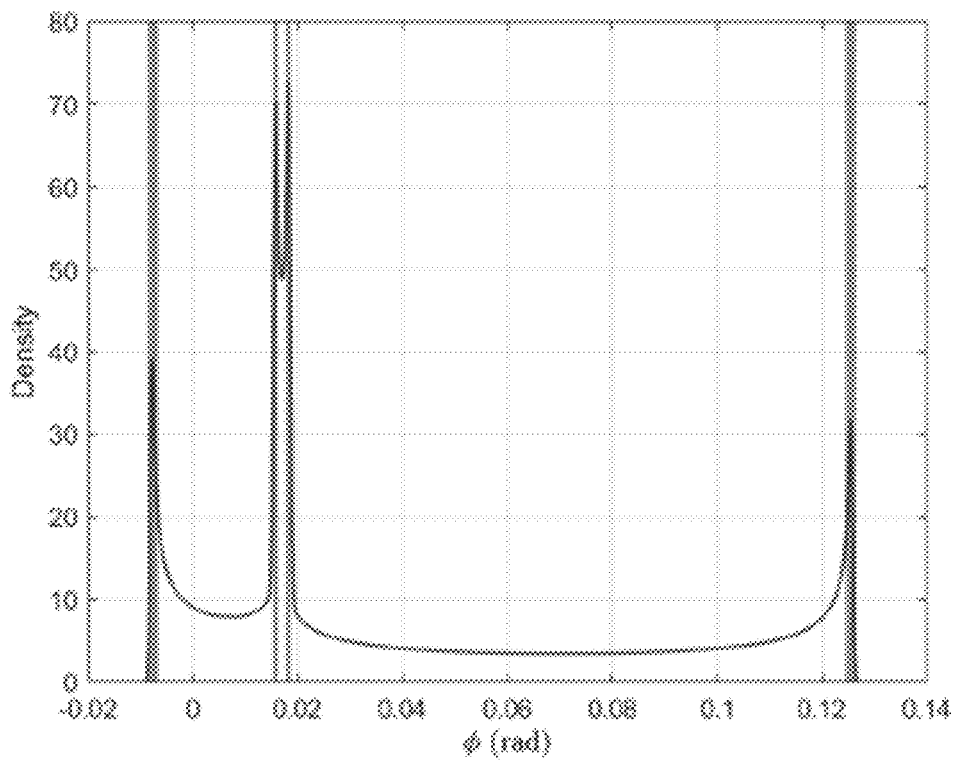
FIG. 8D illustrates a corresponding density distribution for the multi-periodic domain response, illustrated in FIG. 8C.

Based on the geometry and shape of the phase space, the density diagram may contain peaks of various heights and sharpness at multiple locations. The peaks of various heights and sharpness occurs because the dynamic system 102 occupies more time at specific regions of the space causing higher densities in those regions. An example of the periodic and multi-periodic phase planes along with their corresponding density distributions of a nonlinear pendulum 500, as illustrated in FIGS. 5A and 5B, is illustrated in FIGS. 8A-8D. FIG. 8A illustrates the phase plane for a periodic domain response, and FIG. 8B illustrates a corresponding density distribution for the periodic domain response. FIG. 8C illustrates the phase plane for a multi-periodic domain response, and FIG. 8D illustrates a corresponding density distribution for the multi-periodic domain response. The additional feature set that was extracted from the density distribution included the location, the height and the sharpness of the peaks in the density profile. The results showed that the introduced features are fully capable of characterizing the nonlinear response of the dynamic system in the periodic and multi-periodic domains with high complexities. The results also demonstrated that the developed parameter estimation approach works effectively for both analytical and experimental data.

The estimated density of the phase space 114 is approximated using an orthogonal basis (216), preferably by the feature extraction engine 116. In one or more cases, the feature extraction engine 116 uses an orthogonal basis, including a number of the basis, a type of orthogonal basis, and other like parameters, to convert the estimated density into coefficients for each orthogonal basis.

To approximate the estimated density, let z be a state of the system and $y_d=\hat{f}h(z)$, and its density is computed using the kernel density estimator. $y_d$ is then approximated with Legendre orthogonal polynomials. It is noted that the example density estimation of the phase space 114 is approximated using Legendre polynomials; however, it should be understood that the density estimation of the phase space 114 may be approximated using other orthogonal polynomials. Legendre polynomials may be obtained from Rodrigues' formula, which is given by:

$$P_m(z) = \frac{1}{2^m m!} \frac{d^m}{dz^m}[(z^2-1)^m], \; m = 0, 1, 2, \ldots \quad (4)$$

Legendre polynomials may also be obtained using Bonnet's recursion formula:

$$(m+1)P_{m+1}(z) = (2m+1)zP_m(z) - mP_{m-1}(z), \quad (5)$$

in which the first two terms are given by:

$$P_0(z) = 1, \; P_1(z) = z. \quad (6)$$

The coefficients of the Legendre polynomials may be obtained using the least squares method assuming the following linear regression model:

$$f(z, \beta) = \sum_{j=1}^{m} \beta_j P_j(z). \quad (7)$$

Letting:

$$Z_{ij} = \frac{\partial f(z_i, \beta)}{\partial \beta_j} = P_j(z_i), \quad (8)$$

The estimated coefficients are given by:

$$\hat{\beta} = (Z^T Z)^{-1} Z^T y_d. \quad (9)$$

The coefficients $\hat{\beta}$ constitute the features that can be used in classification or regression problems. The approximated density using Legendre polynomials is then calculated using the following:

$$f = Z\hat{\beta}. \quad (10)$$

Root mean square error (RMSE) and Pearson's correlation coefficient (PCC) are calculated to compute the quality of the fit using the following equations:

$$RMSE = \sqrt{\frac{1}{N} VV^T}, \quad PCC = \frac{a^T b}{\sqrt{(a^T a)(b^T b)}}, \quad (11)$$

in which $V=(y_d-f)$ is the residual vector, N is the number of points in the density function, $a=(y_d-E\{y_d\})$ and $b=(f-E\{f\})$, where $E\{.\}$ is the expected value.

Referring to the first example of analyzing known speed domains, Legendre polynomials were used to approximate the estimated density distribution of the horizontal vibration signal for every rotational speed and bearing condition. The Legendre polynomial order was selected based on the least polynomial order that gives a reliable fit between the estimated and approximated density functions. To compute the quality of the fit, root mean square error and Pearson's correlation coefficient were calculated. Based on these metrics, Legendre polynomials of order 20 were used to approximate the estimated density functions. Coefficients for the Legendre polynomials were computed for each of the 760 signal samples using the least squares method as shown in formula (9). The computed coefficients for each case, which represent the feature vector for that case, were saved in a 21-element vector (using only the horizontal vibration signal). Because of high impact of the rotation speed on the response of the dynamic behavior, it was used as an additional feature, making the total number of features equal to 22.

Referring to the second example of analyzing bounded speed domains, density distributions were constructed using both horizontal and vertical vibration data for every speed and bearing condition. Then using Legendre polynomials of order 20, the estimated density functions were approximated. The feature set was constructed using the first 15 Legendre polynomial coefficients in each direction in addition to the rotational speed of the shaft making the total number of features equal to 31. The feature vector was then used as an input for training the fault detection model 119.

The feature extraction engine 116 assigns the coefficients of the orthogonal basis as features (218). In one or more cases, the feature extraction engine 116 assigns each coefficient as a feature that characterizes the phase space 114. In one or more cases, the feature extraction engine 116 ranks the features (220). Having ranked the features, the feature extraction engine 116 may select an optimal set of features to input into the fault detection model 119. For the cases in which the coefficients decrease by an increasing number of orthogonal functions, the calculated coefficients may be ranked naturally.

With respect to the embedded dimension process 206B as illustrated in FIG. 2C, having received the constructed phase space 114, the feature extraction engine 116 determines an average distance of the states of the dynamic system 102 in a dimension of the phase space 114 (222). The average distance of the states in a dimension of the phase space 114 may be the states that are the nearest neighbors. The feature extraction engine 116 determines an average distance of the states of the dynamic system 102 in another dimension of the phase space 114 (224). For a given parameter of the dynamic system 102, the feature extraction engine 116 determines an average distance of the states of the dynamic system 102 for all or a plurality of dimensions of the phase space 114.

For example, the feature extraction engine 116 may apply Takens theorem to obtain a structure with a delay embedding that is topologically equivalent to the system trajectory. For instance, reconstructed time-delay vectors can be defined as follows:

$$y_i(d) = (x_i, x_{i+\tau}, \ldots, x_{i+(d-1)\tau}) \quad (12)$$

$$i = 1, 2, \ldots, N - (d-1)\tau$$

where $\tau$ is the time-delay and d is the embedding dimension. $y_i(d)$ represents the ith reconstructed vector with d embedding dimension and $\Upsilon$ time-delay.

The time-delay $\tau$ can be calculated using Average Mutual Information (AMI) as follows:

$$I(\tau) = \sum_{i=1}^{N} p(x_i, x_{i+\tau}) \log_2 \frac{p(x_i, x_{i+\tau})}{p(x_i) p(x_{i+\tau})} \quad (13)$$

where $p(x_i, x_{i+\tau})$ is the probability of observing $x_i$ and $x_{i+\tau}$ and $p(x_i)$ is the probability of observing $x_i$. The AMI can determine when the values of $x_i$ and $x_{i+\tau}$ are sufficiently independent from each other to be useful as coordinates in the reconstructed vector but not so independent as to be completely unrelated to one another. The time-delay $\tau$ is then selected at the first minimum of the AMI.

The next step consists of determining the average distance of each point with nearest neighbor. To do so, we need to calculate the nearest neighbor. The nearest neighbor in the phase space of the vector $y_i(d)$ is defined as $y_{n(i,d)(d)}$ which can be found by calculating the distance which is defined by the maximum norm as follows:

$$\|y_k(m) - y_l(m)\| = \max_{0 \leq j \leq m-1} |x_{k+j\tau} - x_{l-j\tau}| \quad (14)$$

where $1 \leq n(i,d) \leq N-d\tau$ is an integer such that $y_{n(i,d)(d)}$ is the nearest neighbor of $y_i(d)$ in the d-dimensional reconstructed phase space.

The average of the absolute distances between the nearest neighbor points as seen in dimension d is:

$$E^*(d) = \frac{1}{N-d\tau} \sum_{i=1}^{N-d\tau} |x_{i+d\tau} - x_{n(i,d)+d\tau}| \quad (15)$$

The distance between points when seen in dimension d+1 relative to the distance in dimension d is:

$$E(d) = \frac{E^*(d+1)}{E^*(d)} \quad (16)$$

Having determined the average distance of the states in the dimensions of the phase space 114, the feature extraction engine 116 determines a ratio of the average distances for the dimensions in the phase space 114 (226) for the parameter. In an example, the feature extraction engine 116 determines the ratio by dividing an average distance of a point with the point's neighbors in dimension (d+1) by an average distance of the point with the point's neighbors in dimension (d), as shown in formula (16) herein. The feature extraction engine 116 may determine the ratio for each parameter. In one or more cases, the feature extraction engine 116 assigns the determined ratios as features (228) that characterize the parameters of the phase space 114. The feature extraction engine 116 ranks the features (230). In one or more cases, when a fault exists, the phase space of the dynamic system 102 changes, and accordingly, the average distances of the states may also change.

In one or other more cases of determining features of the phase space 114, the feature extraction engine 116 applies a recurrence plot to the phase space 114. The feature extraction engine 116 applies the recurrence plot, using one or more raw signals provided by one or more sensors, such as sensor 104 and sensor 106, to determine times in which phase space trajectories are in the same place. The feature extraction engine 116 derives the mutual information from the recurrence plot. In one or more cases, the feature extraction engine 116 applies a Recurrence Quantification Analysis (ROA) to the recurrence plot to quantify one or more measurements of the recurrence plot, and derives the features from these measurements. The measurements may include, for example, but not limited to, Recurrence rate (RR), Determinism (DET), Longest Diagonal Line (LMAX), Entropy (ENT), and other like measurements. Having determined the features from the measurements, the feature extraction engine 116 ranks the features of the fault.

In one or more other cases, before the diagnostic system 110 acquires the data of the operating condition of the component of the dynamic system 102, the diagnostic system 110 may optionally provide a diagnostic signal to the dynamic system 102 (201, as shown in FIG. 2A). In one or more cases, the diagnostic signal may be a predefined signal that does not affect the operation of the component. For example, the diagnostic signal may be an electrical current that is oscillatory with enough frequency to be measured but not affect the operation of the component, e.g., a servo actuator. In other words, such diagnostic signal would be injected at a specific frequency that can enrich the nonlinear response of the dynamic system 102, to unfold hidden information about the health condition of the dynamic system 102, and yet not cause harm to the dynamic system 102. For example, the signal amplitude for the servo actuator may be AI=0:01 A, and the signal frequency may be f1=4000 Hz. In one or more cases, the signal may utilize a specific amplitude and frequency, or a range of amplitudes and frequencies to aide in detecting certain types of faults. For the cases in which the dynamic system 102 operates in a normal state, the diagnostic system 110 may have difficulty in detecting a fault. However, by measuring the diagnostic signal, the diagnostic system 110 may analyze the diagnostic signal in conjunction with the other signal parameters to determine whether the dynamic system 102 has a fault. For example, to detect a fault, the diagnostic system 110 may analyze the diagnostic signal by comparing the input of the diagnostic signal to the output of the diagnostic signal. Having provided the diagnostic signal to the dynamic system 102, the DAQ system 108 acquires and preprocesses the data, and the diagnostic system 110 determines one or more features of the phase space 114, as described herein. For example, having injected the predefined diagnostic signal into the dynamic system 102 and extracted the fault-related features from the phase space topology, one or more example regression models are built using an artificial neural network, which maps the feature space to identify the faults represented by the system's parameters.

In one or more cases, a fault detection model 119 is trained (208), preferably by the model training engine 118. In one or more cases, the feature extraction engine 116 selects a set of features based on the determined ranking and provides the features as input into the fault detection model 119. In one or more cases, the fault detection model 119 may be a linear model, e.g., a linear support vector machine, a neural network, or the like. For example, the fault detection model 119 may be an artificial neural network (ANN), which includes a set of computational models that recognize a relation or a pattern between inputs and outputs. ANN may include an interconnected group of nodes, i.e., artificial neurons, and each node has a corresponding weight. The ANN may be trained using one or more algorithms, such as a backpropagation algorithm, which optimizes the weights of the ANN by propagating an input forward through the network layers to the output layer where the calculated output is compared with the desired output. The error values of the calculated output and the desired output are then computed and propagated backwards. These errors are traced back to each associated neuron to update the weights.

Having trained the fault detection model 119, the diagnostic engine 120 performs diagnostic testing on a dynamic system (210), leading to fault prediction 122. The dynamic system may be dynamic system 102 implemented in a live environment. The dynamic system may be another dynamic system that includes components similar to the components of the dynamic system 102.

Referring to the first example of analyzing known speed domains, from all available sampled data (760 samples), 50% of the sample data (380 samples) was used to train the ANN, 25% of the sample data (190 samples) was used to validate the training algorithm and the remaining 25% of sample data (190 samples) was used to test the classifier. The backpropagation algorithm was used for training the ANN, with ten hidden neurons.

The performance of the selected classification model is presented using confusion matrices, as shown in FIGS. 4A and 4B. A confusion matrix compares the results of the predicted and the actual classes. Each row of the matrix shows the prediction results for the corresponding class at that row, while each column shows the actual class. The main diagonal elements of the matrix show the correct classified prediction for each corresponding class, which are known as true positives. For each row of the matrix, all elements except the main diagonal elements are the misclassified prediction for the corresponding class, which are known as false positives. For each specific class, the summation of elements on its corresponding column excluding the main diagonal elements are called false-positive elements. The performance of the classifier can be evaluated using certain evaluation matrices derived from the confusion matrix, such as sensitivity, precision and overall accuracy. FIG. 4A shows the predictions, (e.g., fault prediction 122), for test data using the neural network classifier for the first example.

As can be observed, the classifier predicted all defects with no misclassification and with 100% sensitivity, 100% precision and 100% overall accuracy. These results are remarkable for a variety of reasons. First, these results demonstrate that the combination of the proximity sensor data and the PST features can address the challenges in fault identification at low rotational speeds (below 10 Hz). Second, no a priori knowledge of the dynamic system 102 was integrated in extracted features. Therefore, the PST approach, i.e., the fault diagnostic process 200, can be applied to diverse dynamical systems in an automated fashion with minimal adaptation or dependence on expertise. For instance, in conventional bearing diagnostic techniques, specific characteristics, such as ball pass frequencies, are searched for within the dynamic system; however, the PST approach does not require any additional analysis.

Referring to the second example of analyzing bounded speed domains, the feature vector was used as an input for training the ANN classifier. The classifier was modeled with ten neurons in the hidden layer and trained using backpropagation algorithm. For training the classification model, four rotational speeds were selected including the machine operating range boundaries (e.g., 300 and 3000 rpm) and the two middle speeds (e.g., 1200 and 2400 rpm). For these speeds, the available vibration data of 160 total samples at different bearing conditions were used for training and the remaining 600 samples obtained at the other speeds (e.g., 420, 600, . . . , 2820 rpm) were used for testing the trained classifier.

The classification results for the test data are represented as a confusion matrix in FIG. 4B. As can be observed, the classifier overall accuracy is 96.7% with 20 misclassifications out of 600 predictions, which indicates a high prediction rate of classifying the four bearing conditions. The precision and sensitivity parameters of the classifier were calculated and are presented in FIG. 4B. In summary, the classifier had both high precision and sensitivity for the majority of the bearing conditions. The classification model was able to distinguish between healthy (H) and defective bearings (e.g., (IR), (OR), and (B)) since there were zero misclassifications of the healthy bearings.

In another example, in which a component of the diagnostic system 110 is a Sikorsky Helicopter Gearbox, the operational condition may be 10 HP and 94 RPM. The diagnostic system 110 may analyze, using the processes described herein, the four configurations of the gearbox (e.g., a healthy gearbox, a gearbox with a root crack on 1 tooth, a gearbox with a root crack on 5 teeth, and a gearbox with a missing tooth), and provide a prediction with an overall accuracy of 99%. In another example, a component is an electro-hydraulic servo actuator with a two-stage servo valve system. The diagnostic system 110 may analyze, using the processes described herein, two configurations of the actuator (e.g., increased friction between the spool and sleeve, and degradation of the permanent magnet of the valve armature), and provide a prediction with an overall accuracy of 99%. In yet another example, a component is a shaft crack detection testing device, and has an operational condition of 1200 rpm. The diagnostic system 110 may analyze, using the processes described herein, two cracks with different severities, in which mutual information was used to rank the features. In this example, three features were used to distinguish between the faults, and the diagnostic system 110 provided a prediction with an overall accuracy of 100%.

It is noted that this disclosure incorporates, by reference and in its entirety, Mohamad, T. H., Nazari, F. & Nataraj, C. A Review of Phase Space Topology Methods for Vibration-Based Fault Diagnostics in Nonlinear Systems. *J. Vib. Eng. Technol.* 8, 393-401 (2020). https://doi.org/10.1007/s42417-019-00157-6.

Figure 3:
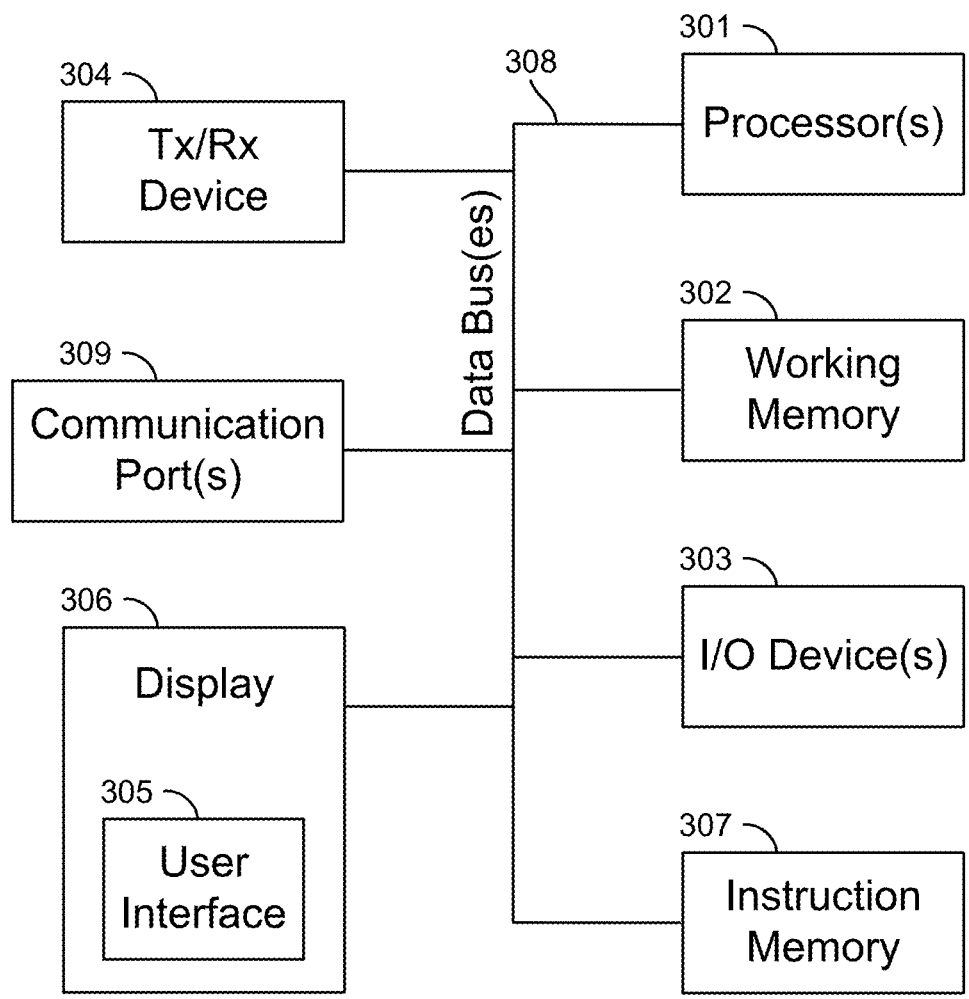
FIG. 3 depicts a block diagram of components of a computing device capable of performing the processes described herein, in accordance with one or more embodiments.

FIG. 3 depicts a block diagram of components of a computing device capable of performing the processes described herein. In particular, FIG. 3 illustrates an example computing device, such as computing device 109, capable of interacting with the DAQ system 108, sensors 104 and 106, and system 102 of FIG. 1.

Computing device 109 can include one or more processors 301, working memory 302, one or more input/output devices 303, instruction memory 307, a transceiver 304, one or more communication ports 309, and a display 306, all operatively coupled to one or more data buses 308. Data buses 308 allow for communication among the various devices. Data buses 308 can include wired, or wireless, communication channels.

Processors 301 can include one or more distinct processors, each having one or more cores. Each of the distinct processors can have the same or different structure. Processors 301 can include one or more central processing units (CPUs), one or more graphics processing units (GPUs), application specific integrated circuits (ASICs), digital signal processors (DSPs), and the like.

Processors 301 can be configured to perform a certain function or operation by executing code, stored on instruction memory 307, embodying the function or operation. For example, processors 301 can be configured to perform one or more of any function, method, or operation disclosed herein.

Instruction memory 307 can store instructions that can be accessed (e.g., read) and executed by processors 301. For example, instruction memory 307 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 301 can store data to, and read data from, working memory 302. For example, processors 301 can store a working set of instructions to working memory 302, such as instructions loaded from instruction memory 307. Processors 301 can also use working memory 302 to store data created during the operation of system 110. Working memory 302 can be a random access memory (RAM) such as a static random access memory (SRAM) or dynamic random access memory (DRAM), or any other suitable memory.

Input-output devices 303 can include any suitable device that allows for data input or output. For example, input-output devices 303 can include one or more of a keyboard, a touchpad, a mouse, a stylus, a touchscreen, a physical button, a speaker, a microphone, or any other suitable input or output device.

Communication port(s) 309 can include, for example, a serial port such as a universal asynchronous receiver/transmitter (UART) connection, a Universal Serial Bus (USB) connection, or any other suitable communication port or connection. In some examples, communication port(s) 309 allows for the programming of executable instructions in instruction memory 307. In some examples, communication port(s) 309 allow for the transfer (e.g., uploading or downloading) of data, such as transaction data.

Display 306 can display user interface 305. User interfaces 305 can enable user interaction with, for example, computing device 109. For example, user interface 305 can be a user interface for an application to view detected faults of the system 102. In some examples, a user can interact with user interface 305 by engaging input-output devices 303. In some examples, display 306 can be a touchscreen, in which the touchscreen displays the user interface 305.

Transceiver 304 allows for communication with a network. For example, if the network is a wireless network, transceiver 304 is configured to allow communications with the wireless network between, for example, sensors 104 and 106 with DAQ system 108 and system 110. In some examples, transceiver 304 is selected based on the type of network systems 102 and 110 will be operating in. Processor(s) 301 is operable to receive data from, or send data to the network, via transceiver 304.

Although the embodiments discussed herein are described with reference to the figures, it will be appreciated that many other ways of performing the acts associated with the embodiments can be used. For example, the order of some operations may be changed, and some of the operations described may be optional.

In addition, the embodiments described herein can be at least partially implemented in the form of computer-implemented processes and apparatus. The disclosed embodiments may also be at least partially implemented in the form of tangible, non-transitory machine-readable storage media encoded with computer program code. For example, the processes described herein can be implemented in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the embodiments. The embodiments may also be at least partially implemented in the form of a computer into which computer program code is loaded or executed, such that, the computer becomes a special purpose computer for practicing the embodiments. When implemented on a general-purpose processor, the computer program code segments configure the processor to create specific logic circuits. The embodiments may alternatively be at least partially implemented in application specific integrated circuits for performing the embodiments.

The foregoing is provided for purposes of illustrating, explaining, and describing embodiments of this disclosure. Modifications and adaptations to the embodiments will be apparent to those skilled in the art and may be made without departing from the scope or spirit of the disclosure.

What is claimed is:

1. A data processing apparatus comprising:
a communications interface;
a memory storing instructions; and
at least one processor coupled to the communications interface and to the memory, the at least one processor being configured to execute the instructions to perform operations comprising:
transmitting a diagnostic signal to a first dynamic system having a first component, the first dynamic system in an operating state;
acquiring signals characterizing an operation condition of the first component of the first dynamic system, the acquired signals comprising the diagnostic signal as affected by its interaction with the first component of the first dynamic system;
determining a phase space of the first dynamic system by correlating the acquired signals and determining at least one of a time lag and mutual information of the correlated signals;
determining features of the phase space of the acquired signals based on performing one of a density based process, an embedded dimension process, or a digital signal phase space topology process;
training a computer fault detection model based on the determined features; and
performing, based on the trained computer fault detection model, diagnostic testing on a second component of a second dynamic system to detect an operation condition fault of the second component.

2. The data processing apparatus of claim 1, wherein the at least one processor is further configured to execute the instructions to perform operations comprising:
acquiring the signals characterizing the operation condition via at least one sensor operably coupled to the first component; and
preprocessing the acquired signals characterizing the operation condition to condition data of the acquired signals characterizing the operation condition.

3. The data processing apparatus of claim 1, wherein the at least one processor is further configured to execute the instructions to perform operations that perform the density based process by:
estimating a density of dimensions of the phase space;
approximating the density of dimensions using an orthogonal basis; and
assigning coefficients of the orthogonal basis as the features of the phase space.

4. The data processing apparatus of claim 3, wherein the at least one processor is further configured to execute the instructions to perform operations comprising ranking the features comprising the assigned coefficients and selecting a set of features to input into the computer fault detection model.

5. The data processing apparatus of claim 1, wherein the at least one processor is further configured to execute the instructions to perform operations that perform the embedded dimension process by:
determining an average distance of states of the dynamic system in a first dimension of the phase space;
determining an average distance of states of the dynamic system in a second dimension of the phase space;
determining a ratio of the determined average distance of states of the dynamic system in the first dimension of the phase space to the determined average distance of states of the dynamic system in the second dimension of the phase space dimensions; and
assigning the determined ratio as one of the features of the phase space.

6. The data processing apparatus of claim 5, wherein the at least one processor is further configured to execute the instructions to perform operations comprising ranking the features comprising the determined ratio and selecting a set of features to input into the fault detection model.

7. The data processing apparatus of claim 1, wherein the computer fault detection model comprises an artificial neural network.

8. The data processing apparatus of claim 1, wherein the diagnostic signal interacts with the first dynamic system to enrich a response from the first dynamic system related to the operation condition of the first component of the first dynamic system.

9. The data processing apparatus of claim 1, wherein the diagnostic signal is configured to not affect the operation condition of the first component.

10. The data processing apparatus of claim 1, wherein parameters of the diagnostic signal are selected to aid in detecting faults in the first dynamic system.

11. The data processing apparatus of claim 1, the at least one processor being further configured to execute the instructions to perform operations comprising:
preprocessing the acquired signals to condition data of the acquired signals.

12. A computer-implemented method, comprising:
transmitting a diagnostic signal to a first dynamic system having a first component, the first dynamic system in an operating state;
acquiring signals characterizing an operation condition of the first component of the first dynamic system, the acquired signals comprising the diagnostic signal as affected by its interaction with the first component of the first dynamic system;
determining a phase space of the first dynamic system by correlating the acquired signals and determining at least one of a time lag and mutual information of the correlated signals;
determining features of the phase space of the acquired signals based on performing one of a density based process, an embedded dimension process, or a digital signal phase space topology process;
training a computer fault detection model based on the determined features.

13. The computer-implemented method of claim 12, further comprising:
acquiring the signals characterizing the operation condition via at least one sensor operably coupled to the first component; and
preprocessing the acquired signals characterizing the operation condition to condition data of the acquired signals characterizing the operation condition.

14. The computer-implemented method of claim 12, wherein performing the density based process comprises:
estimating a density of dimensions of the phase space;
approximating the density of dimensions using an orthogonal basis; and
assigning coefficients of the orthogonal basis as the features of the phase space.

15. The computer-implemented method of claim 14, further comprising ranking the features comprising the assigned coefficients and selecting a set of features to input into the computer fault detection model.

16. The computer-implemented method of claim 12, wherein performing the embedded dimension process comprises:
determining an average distance of states of the dynamic system in a first dimension of the phase space;
determining an average distance of states of the dynamic system in a second dimension of the phase space;
determining a ratio of the determined average distance of states of the dynamic system in the first dimension of the phase space to the determined average distance of states of the dynamic system in the second dimension of the phase space; and
assigning the determined ratio as one of the features of the phase space.

17. The computer-implemented method of claim 16, further comprising ranking the features comprising the determined ratio and selecting a set of features to input into the fault detection model.

18. The computer-implemented method of claim 12, wherein the computer fault detection model comprises an artificial neural network.

19. The computer implemented method of claim 12, further comprising:
performing, based on the trained computer fault detection model, diagnostic testing on a second component of a second dynamic system to detect an operation condition fault of the second component.

20. A tangible, non-transitory computer-readable medium storing instructions that, when executed by at least one processor, cause the at least one processor to perform a method, comprising:
transmitting a diagnostic signal to a first dynamic system having first component, the first dynamic system in an operating state;
acquiring signals characterizing an operation condition of the first component of the first dynamic system, the acquired signals comprising the diagnostic signal as affected by its interaction with the first component of the first dynamic system;
determining a phase space of the first dynamic system by correlating the acquired signals and determining at least one of a time lag and mutual information of the correlated signals;
determining features of the phase space of the acquired signals based on performing one of a density based process, an embedded dimension process, or a digital signal phase space topology process;
training a computer fault detection model based on the determined features; and
performing, based on the trained computer fault detection model, diagnostic testing on a second component of a second dynamic system to detect an operation condition fault of the second component.

* * * * *